United States Patent Office 3,054,755
Patented Sept. 18, 1962

3,054,755
POLYURETHANE PLASTICS
Erwin Windemuth, Leverkusen, and Rudolf Merten, Koln-Mulheim, Germany, assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware
No Drawing. Filed Aug. 11, 1958, Ser. No. 754,176
Claims priority, application Germany Aug. 13, 1957
11 Claims. (Cl. 260—2.5)

This invention relates to polyurethane plastics and, more particularly, polyurethane plastics which are reaction products of organic polyisocyanates and polyhydroxyl compounds based on polyalkylene ether glycols and having an improved reactivity.

It has been known heretofore to use polyalkylene ether glycols in the manufacture of polyurethane plastics by the polyisocyanate polyaddition process. Linear or branched polyalkylene ether glycols, which may contain several hydroxyl groups, are obtained from alkylene oxides by polymerization or addition reactions with polyfunctional alcohols, amino alcohols, or amines. Polyalkylene ether glycols, however, cannot be used directly in every case for the manufacture of polyurethane products of high molecular weight. For example, it has not been possible to produce serviceable lacquer coatings from hydroxyl terminated polymerization products of linear or branched polyalkylene ether glycols and organic polyisocyanates. The polyalkylene ether glycols and also their reaction products with polyisocyanates are of too low viscosity and also show too little reactivity to form a serviceable lacquer coating. Moreover, it has always been difficult to use polyalkylene ether glycols to form cellular polyurethane plastics by the heretofore known processes in a single working operation. In these known processes, a number of components comprising a polyhydroxyl compound, polyisocyanate, and an activator mixture consisting of water, accelerators, and additives are combined and thoroughly mixed. The reaction mixture is usually not sufficiently viscous to support the cellular structure formed by the blowing action of the carbon dioxide evolved by the reaction mixture. Therefore, the entire structure is apt to collapse before the mixture solidifies. In order to obviate the processing difficulties which arise in this instance, initial polyhydroxyl adducts containing isocyanates are prepared in advance from the polyalkylene ether glycols and polyisocyanates. The above reaction products are then mixed with additional polyisocyanates and the activator mixture in a separate step in time from the formation of the initial reaction product and converted into cellular polyurethane plastics. Furthermore, polyalkylene ether glycols cannot readily be used together with polyisocyanates to form adhesives. In contrast, for example, to polyester and polyisocyanate combinations, serviceable adhesive materials are not obtained by using equivalent quantities calculated on the OH and NCO groups present. In the adhesive field, as in the cellular polyurethane plastics referred to above, it is advisable to use hydroxyl terminated reaction products of polyisocyanate and polyalkylene ether glycol as a starting material.

It is, therefore, an object of the present invention to provide a process for the production of polyurethane plastics from polyhydroxyl compounds, polyisocyanates, and, if necessary, cross-linking agents which avoid the heretofore difficulties encountered with the use of polyalkylene ether glycols as the polyhydroxyl compound. Another object is to provide a polyhydroxyl compound of increased reactivity with an organic polyisocyanate. Still another object is to provide novel polyhydroxyl compounds based on polyalkylene ether glycols which have a sufficient viscosity to be readily employed, by themselves, with organic polyisocyanates and an activator mixture to form cellular polyurethane plastics. A further object is to provide polyurethanes prepared from the polyhydroxyl compounds provided by this invention.

The above objects and others are accomplished in accordance with the present invention, generally speaking, by providing a secondary amino alcohol modified reaction product of a polyalkylene ether glycol with an excess of an organic polyisocyanate. The new polyhydroxyl compounds provided by the present invention contain primary hydroxyl groups which contribute to their higher reactivity with organic polyisocyanates. Moreover, the higher reactivity of the new polyhydroxyl compounds is also attributed to the fact that the compounds contain urea groups in immediate juxtaposition with the terminal primary hydroxyl groups.

Any suitable polyalkylene ether glycol may be used to provide the base for the novel polyhydroxyl compounds of the present invention. For example, linear polyalkylene ether glycols of various molecular weights may be used which are obtained by polymerization of alkylene oxides; such as, for example, ethylene oxide, propylene oxide, 1,2- or 2,3-butylene oxides, or the like. Furthermore, hydroxy terminated polymers of styrene oxide, epichlorhydrin and tetrahydrofuran, and the like may be provided as a base for the polyhydroxyl compounds of the present invention. It is preferred, however, that the polyalkylene ether glycol have an hydroxyl content of from about 0.5 to about 15% and a molecular weight of at least about 500. Furthermore, copolymers of any of the above may be used.

The polyalkylene ether glycol base material may be modified by polyfunctional alcohols, amino alcohols, or amines to provide linear or branched addition products. Any suitable polyfunctional compound may be used, for example, ethylene glycol, trimethylol propane, butane-1,2,4-triol, glycerine, castor oil, ethanolamine, diethanolamine, triethanolamine, aniline, ethylene diamine, tetramethylene diamine or hexamethylene diamine, and the like. It may, of course, be desirable to use mixtures of different types of linear or branched polyalkylene glycol ethers.

Furthermore, the polyalkylene ether glycol base may be used in admixtures with other polyhydroxyl compounds, for example, 1,4-butylene glycol, trimethylol propane, pentaerythritol, tartaric acid esters, castor oil, and the like.

Any suitable organic polyisocyanate may be used in accordance with the present invention, such as, for example, tetramethylene diisocyanate, hexamethylene diisocyanate, m-xylylene diisocyanate, p-xylylene diisocyanate, 4,6-dimethyl-1,3-xylylene diisocyanate, cyclohexane-1,4-diisocyanate, dicyclohexylmethane-4,4'-diisocyanate, m-phenylene diisocyanate, p-phenylene diisocyanate, toluylene diisocyanate, 3-(alpha-isocyanato-ethyl)-phenyl isocyanate, 1-alkyl benzene-2,6-diisocyanates, 2,6-diethyl benzene-1,4-diisoycyanate, diphenyl methane-4,4'-diisocyanate, diphenyl dimethyl methane-4,4'-diisocyanate, 3,3'-dimethoxy diphenyl methane-4,4'-diisocyanate, naphthalene-1,5-diisocyanate, and the like.

Any suitable secondary amino alcohol may be used in accordance with the present invention. Suitable secondary amino alcohols are those having the general formula

wherein R represents any organic radical which may contain an alcoholic hydroxy group, and R' represents an organic radical containing an alcoholic hydroxy group. Examples are N-methyl ethanolamine, N-ethyl ethanolamine, N-butyl ethanolamine, N-hydroxyethyl aniline, N-isopropyl amine-1,3, N-cyclohexyl propanolamine-1,3, diethanol amine, dimethanol amine, and methanol ethanol amine.

By reacting the polyalkylene glycol ethers containing hydroxyl groups with polyisocyanates, reaction products containing free NCO groups are initially produced. These are easily obtained by combining the components and heating the mixture until reaction of all the hydroxyl groups is complete which can be controlled in a simple manner by determining the isocyanate content. The polyisocyanate is used in such an amount that the ratio between NCO and OH groups is greater than 1, and preferably in the region of 2. The reaction may be accelerated by catalysts. For acceleration purposes, it is advisable to use additives of soluble heavy metal compounds, for example, iron acetylacetonate, mercury-II-acetate, titanium tetrabutylate, titanium-III-chloride, copper acetylacetonate, cobalt acetylacetonate, or manganese acetylacetonate.

The reaction to provide the product containing NCO groups is often completed in a few minutes by using the said catalysts and temperatures of 100–120° C. In this way, it is readily possible to provide for a continuous method of production by the regulated supply of the reactants by means of pumps. Furthermore, it is frequently advantageous to use solvents, especially in those cases where highly viscous end products are obtained. Only solvents which are free from hydrogen atoms reactive with isocyanate are suitable, such as, for example, ketones, esters, and saturated or unsaturated aliphatic or aromatic hydrocarbons or chlorination products thereof. The products containing free NCO groups are more or less vicous oils or sometimes even substances which are solid at room temperature. Products of higher viscosity are obtained in proportion as the ratio between the NCO and OH groups employed approaches the value 1.

These products are thereafter reacted with an excess of secondary amino alcohols, calculated on the free NCO groups. Generally speaking, the quantity is so chosen that only the amino-hydrogen of the amino alcohol reacts with the NCO groups of the initial adduct. In such a case, the ratio between NCO groups and reactive hydrogen atoms is at least 1:2, for example, when using N-methyl ethanolamine, and at least 1:3 when using diethanolamine. Since the reaction of amines with isocyanates proceeds at high velocity, the reaction is usually completed in a few minutes. It proceeds exothermically and is accompanied by a usually large increase in viscosity. The resulting reaction products contain exclusively hydroxyl groups in immediate juxtaposition to urea groups. A possible explanation of their observed high reactivity with respect to isocyanates is to be found in this fact. The novel polyhydroxy compounds are in every case soluble in organic solvents.

The polyhydroxy compounds with a base of polyalkylene glycols, isocyanates and secondary amino alcohols, which have been referred to, are excellently suited for starting materials for further reactions by the diisocyanate polyaddition process. In view of the large number of the linear and branched polyalkylene glycol ethers and the numerous polyisocyanates and secondary amino alcohols which are available, it is possible to prepare a large number of combinations of polyhydroxy compounds to be used according to the invention.

The reaction thereof with diisocyanates and other polyisocyanates to provide different types of polyurethane plastics takes place in a manner known per se. It is possible to use a polyisocyanates inter alia the polyisocyanates which have been referred to above. In addition, diisocyanates containing urethdione groups may be used, and also those isocyanates the isocyanate group of which is blocked by a component which splits off, for example, phenols, the said component being split off only on heating to liberate the NCO group.

Depending on the proposed use, the reaction between the polyhydroxy compounds to be used according to the invention and the said polyisocyanates can take place with a deficiency, with equivalent quantities or with an excess of polyisocyanates and, if necessary, cross-linking agents can be added in known manner. By using water as the cross-linking agent, foam materials are obtained. According to these known processes, it is now possible when using polyalkylene glycol ethers to produce porous or homogeneous elastic or rigid plastics, lacquer coatings, adhesives, coating materials, and the like, without any difficulty.

The invention is further illustrated by the following examples, without being restricted thereto, the parts being by weight.

*Example 1*

To 1000 parts of polypropylene glycol (molecular weight 2000, hydroxyl number 56, viscosity 42.4 cp./75° C.) are added 0.25 cc. of benzoyl chloride and 0.1 part of iron acetylacetonate, the latter dissolved in 5 cc. of benzene, and the resulting mixture heated while stirring. 174 parts of toluylene-2,4-diisocyanate are added at 80° C. The temperature rises immediately to about 110° C. and is raised by supplementary heating to 120° C. After a reaction period of 15 minutes from the time when the isocyanate is added, the mixture is cooled and another 0.25 cc. of benzoyl chloride is added at 80° C. The product obtained has an NCO content of 3.22% and a viscosity of 343 cp./75° C.

105 parts of N-hydroxyethyl aniline are added at 40° C. to 1000 parts of this product while stirring vigorously. The temperature of the reaction mixture rises to 65° C. without supplementary heating. To remove dissolved gases the reaction product is subjected to a vacuum treatment at 20 mm. Hg for 30 minutes. A light yellow reaction product which has a hydroxyl number of 39 and a viscosity of 1860 cp./75° C. is formed.

The polyhydroxy compound is used for the manufacture of elastic foam materials. 150 parts thereof are thoroughly mixed with 51 parts of toluylene diisocyanate which contains the isomers toluylene-2,4-diisocyanate and toluene-2,6-diisocyanate in the ratio of 65:35, 7 parts of ethyl morpholine, 2 parts of a 50% solution in water of a sulphonated castor oil and 2 parts of water to which 0.1 part of potassium hydroxide is added. The mixture starts to foam immediately and solidifies as a highly elastic foam material.

*Example 2*

To 500 parts of a linear mixed polyalkylene glycol ether (OH number 56, viscosity 44 cp./75° C.) which contains propylene oxide and ethylene oxide in the ratio of 9:1, are added 0.125 cc. of benzoyl chloride at room temperature and 90 parts of toluylene-2,4-diisocyanate and toluylene-2,6-diisocyanate with the isomers mixed in the ratio of 65:35 at 80° C., whereupon the polyalkylene glycol ether is heated to 120° C. and left at this temperature for 1 hour. The product has an NCO content of 3.64% and a viscosity of 254 cp./75° C.

66 parts of N-hydroxyethyl aniline are added at 40° C. and while stirring to 554 parts of this product, whereby the temperature rises to 65° C. After removing dissolved gases by evacuation over a short period at 20 mm. Hg, an almost colorless polyhydroxy compound wtih a viscosity of 1165 cp./75° C. and a hydroxyl number of 43 is obtained.

The polyhydroxy compound is suitable for the manufacture of foam materials. For this purpose, 150 parts thereof are thoroughly mixed with 51 parts of the toluene diisocyanate previously described, 7 parts of ethyl morpholine, 2 parts of sulphonated castor oil (50% in water) and 2 parts of water to which 0.1 part of sodium hydroxide has been added. The mixture starts to foam immediately and solidifies as an elastic foam material.

Example 3

To 1000 parts of the polypropylene glycol described in Example 1 are added 0.016 part of iron acetylacetonate and 0.8 cc. of normal sulphuric acid, and then 200 parts of toluylene-2,4-diisocyanate are added thereto at 80° C., the mixture then being heated for 35 minutes at 120° C. After this period of time, a product with an NCO content of 3.0% and a viscosity of 1200 cp./75° C., is obtained. A solution of 20 parts of N-methyl ethanolamine in 32 parts of ethyl acetate are added at 40° C. to 375 parts of this product in 100 parts of ethyl acetate. The temperature rises immediately to 65° C. with simultaneous brightening of the reaction material. The resulting clear 75% solution has a viscosity of 1675 cp./75° C. and a hydroxyl content of 1.15%, based on the solid product.

100 parts of the 75% solution are mixed with 15 parts of a likewise 75% solution of a polyisocyanate of higher molecular weight obtained from 1 mol of trimethylol propane and 3 mols of toluylene-2,4-diisocyanate and having an NCO content of 14.5%, based on the solution, and the said solution is spread as a thin layer on a glass support, a flexible plastic film is obtained after being left for 24 hours, and this film can be lifted from the support. The film is insoluble in organic solvents and shows a good resistance to breaking by bending.

Example 4

123 parts of toluylene-2,4-diisocyanate are added at 80° C. to a mixture of 900 parts of the polypropylene glycol described in Example 1, 100 parts of castor oil, 0.25 cc. of benzyl chloride and 0.1 part of iron acetylacetonate (this corresponding to a ratio between NCO and OH of 2), the addition takes place while thoroughly mixing the components. The temperature rises to 110° C. and the mixture is heated to 120° C. by supplying heat and left for 15 minutes at this temperature. After cooling, another 0.25 cc. of benzoyl chloride is added. The resulting product has an NCO content of 4.0% and a viscosity of 395 cp./75° C.

152.5 parts of N-hydroxyethyl aniline are added at 40° C. to 1168 parts of the product. The temperature rises immediately to 62° C. After heating for a short time at 80° C. under a vacuum of 20 mm. Hg, a light yellow polyhydroxy compound having a viscosity of 3050 cp./75° C. and a hydroxyl content of 1.43% is formed.

200 parts of the polyhydroxy compound are mixed with 15 parts of toluylene diisocyanate containing the isomers toluylene-2,4-diisocyanate and toluylene-2,6-diisocyanate in the ratio of 65:35 and then heated for 6 hours at 120° C., a cross-linked flexible plastic which is insoluble in organic solvents and which has a Shore hardness of 40° C. is obtained.

Example 5

20 parts of the polyhydroxy compound described in Example 4 are dissolved in 20 parts of ethyl acetate and mixed with a solution of 6.2 parts of a splitting-off compound which is obtained in known manner from 1 mol of trimethylol propane, 3 mols of toluylene-2,4-diisocyanate and 3 mols of phenol and which are dissolved in 20 parts of monomethyl glycol ether acetate. A vulcanized rubber plate is thinly coated with this mixture and heated for 10 minutes at 180° C. after the solvent has vaporized. A glossy flexible lacquer coating is obtained on the rubber plate, the said coating adhering thereto very firmly and not becoming brittle even after being bent many times.

Example 6

250 parts of the product containing free NCO groups as described in Example 3 are mixed with 18.75 parts of diethanolamine dissolved in 90 parts of acetone, provision being made for thorough mixing while the amine is being added. The temperature rises in a few minutes from 30° C. to 52° C. A clear light yellow solution which contains a polyhydroxy compound with a content of 2.26% of OH, calculated on solid substance, is obtained.

To 100 parts of the 75% solution of this polyhydroxy compound are added 30 parts of a likewise 75% solution in ethyl acetate of an isocyanate of higher molecular weight obtained from 1 mol of trimethylol propane and 3 mols of toluylene-2,4-diisocyanate. The solution is applied by means of a doctor blade to a Perlon fabric and the latter is heated for 1 hour in a drying chamber at 100° C. An impregnated Perlon fabric which has become impervious to water is obtained. Manifold impregnating effects are produced according to the nature of the fabric and the type and quantity of the application.

Example 7

0.25 cc. of benzoyl chloride and 0.1 part of iron acetylacetonate are added at room temperature to 1000 parts of the polypropylene glycol described in Example 1, and then 168 parts of hexamethylene diisocyanate are added at 80° C. The temperature rises in the course of 5 minutes to 109° C. The mixture is heated further to 120° C. and kept at this temperature for 30 minutes. A product which has 3.24% of NCO and a viscosity of 3114 cp./75° C. is formed.

207 parts of N-ethyl ethanolamine are added to 300 parts of the product, a rise in temperature from 28° C. to 58° C. being observed. A polyhydroxy compound which has a hydroxyl content of 1.2% and a viscosity of 2110 cp./75° C. is formed.

To 100 parts of a 75% solution of this polyhydroxy compound in ethyl acetate are added 16 parts of a likewise 75% solution in ethyl acetate of an isocyanate of higher molecular weight obtained from 1 mol of trimethylol propane and 3 mols of toluylene-2,4-diisocyanate, the mixture then being applied with a brush to a wooden support after having been diluted with 30 parts of monomethyl glycol ether acetate to improve the brushability. After being left for 24 hours, the applied layer has solidified to form an insoluble flexible film.

Example 8

0.075 cc. of benzoyl chloride and 0.03 part of iron acetylacetonate are added at room temperature to 300 parts of the polypropylene glycol described in Example 1, after which 56.4 parts of 3-(alpha-isocyanatoethyl)-phenyl isocyanate are added at 80° C., whereupon the mixture is heated to 120° C. and left at this temperature for 25 minutes. An adduct with an NCO content of 3.07% and a viscosity of 478 cp./75° C. is formed. 272 parts of this adduct are mixed while stirring vigorously with 27.2 parts of N-hydroxyaniline. After a few minutes, with a slight positive heat effect, a polyhydroxy compound which has a viscosity of 3280 cp./75° C. and a hydroxyl content of 1.13% has formed.

To prepare an initial material for coating purposes, 100 parts of the polyhydroxy compound are dissolved in 100 parts of dry ethyl acetate and 12.5 parts of 3-(alpha-isocyanato-ethyl)-phenyl isocyanate are added at 50° C. After heating for 30 minutes at 70–80° C., an adduct which has an NCO content of 2.4%, calculated on solid substance is formed. A cotton fabric is coated with this solution, using a coating blade. After the solvent has evaporated at a moderately elevated temperature, the coated fabric is introduced for a period of 30–60 seconds into an atmosphere of ethylene diamine gas. The layer, which until then has still been tacky, is converted during this time into a film which is no longer tacky, whereby the fabric has become water-proof.

Example 9

39 parts of toluylene-2,4-diisocyanate are added at 80°

C. to 300 parts of a tetrahydrofuran polymer with terminal hydroxyl groups and an OH number of 41.7 after the polymer has been subjected to a brief vacuum treatment at 100° C. to remove small amounts of water. After a reaction time of 30 minutes at 120° C., an adduct which has an NCO content of 3.12% and a viscosity of 2370 cp./75° C. is obtained.

20 parts of N-ethyl ethanolamine are added at 40° C. to 300 parts of this adduct in 300 parts of ethyl acetate. After a short reaction time, a polyhydroxy compound with 1.18% of OH, calculated on solid substance, is formed in ethyl acetate solution.

To 100 parts of this solution are added 10 parts of a 75% solution in ethyl acetate of an isocyanate of higher molecular weight obtained from 1 mol of trimethylol propane and 3 mols of toluylene-2,4-diisocyanate. The lacquer solution thus prepared is applied in a thin layer to an element consisting of foam material. After heating for 1 hour at 120° C. the previously tacky layer has become converted into a flexible lacquer film.

*Example 10*

0.5 cc. of benzoyl chloride is added at room temperature to 200 parts of an addition product obtained from trimethylol propane and ethylene oxide and having an OH number of 60, and then 36 parts of toluylene-2,4-diisocyanate are added at 60° C. After a reaction period of 10 minutes at 120° C. an adduct with an NCO content of 3.95% is formed. By adding 19.6 parts of N-ethyl ethanolamine, a polyhydroxy compound with a hydroxyl content of 1.47% is obtained therefrom.

To 100 parts of a 75% solution of this polyhydroxy compound in ethyl acetate are added 30 parts of a likewise 75% solution of the isocyanate of higher molecular weight as described in Example 9. Lacquer coatings produced with this mixture dry at room temperature in about 20 hours. The films which are formed are flexible and swellable in water, but inert with respect to aliphatic hydrocarbons.

*Example 11*

200 parts of the polypropylene glycol described in Example 1 are mixed with 200 parts of castor oil. 0.1 cc. of benzoyl chloride and 0.04 part of iron acetylacetonate are added to this mixture at room temperature, and 146.8 parts of toluylene-2,4-diisocyanate are added thereto at 80° C. The reaction mixture is heated immediately to 105° C. after adding the isocyanate. It is heated further to 120° C. and left for 15 minutes at this temperature. An adduct which has an NCO content of 6.56% and a viscosity of 592 cp./75° C. is formed.

59 parts of N-methyl ethanolamine are mixed with 507 parts of this produce while mixing thoroughly. After a short reaction time, a polyhydroxy compound with a hydroxyl content of 2.36% and a viscosity of 15.56 cp./ 75° C. is formed.

300 parts of this polyhydroxy compound are mixed on a mixing roller stand with 45 parts of dimeric toluylene-2,4-diisocyanate, 472 parts of dry kaolin and 3 parts of zinc stearate. The temperature of the rollers is thereby raised to 120° C. The initially tacky substance is soon transformed into a sheet which is lifted from the rollers. This sheet is pressed between steel plates for 20 minutes at 160° C. to form plates with a thickness of 3 mm. A flexible plate which is suitable for packings for steam pipes is obtained.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

What is claimed is:

1. An organic compound having primary hydroxyl groups prepared by reaction of a polyhydric polyalkylene ether having secondary hydroxyl groups, a molecular weight of at least about 500 and an hydroxyl content of from about 0.5 percent to about 15 percent, with an organic polyisocyanate to form an adduct having terminal —NCO groups and reacting the adduct with only the secondary amino group of a compound having the formula $$HOR\text{—}NH\text{—}R_1$$

wherein R is an alkylene radical, the OH is a primary hydroxyl group, and $R_1$ is selected from the group consisting of —ROH, an aryl radical, an alkyl radical and a cyclohexyl radical.

2. An organic compound having primary hydroxyl groups prepared by reaction of a polyhydric polyalkylene ether having secondary hydroxyl groups, a molecular weight of at least about 500 and an hydroxyl content of from about 0.5 percent to about 15 percent, with an organic polyisocyanate to form an adduct having terminal —NCO groups and reacting the adduct with only the hydrogen of the secondary amino group of a compound having the formula $$HOR\text{—}NH\text{—}R_1$$

wherein R is an alkylene radical, the OH is a primary hydroxyl group, and $R_1$ is selected from the group consisting of —ROH, an aryl radical, an alkyl radical and a cyclohexyl radical.

3. The product of claim 2 wherein said secondary amine is selected from the group consisting of N-methyl ethanolamine, N-ethyl ethanolamine, N-butyl ethanolamine, N-hydroxyl ethyl aniline, N-isopropyl propanolamine, N-cyclohexyl propanolamine, diethanolamine, dimethanolamine and methanol ethanolamine.

4. A method for making a compound having primary hydroxyl groups which comprises reacting a polyhydric polyalkylene ether having secondary hydroxyl groups, a molecular weight of at least about 500 and an hydroxyl content of from about 0.5 percent to about 15 per percent, with an organic polyisocyanate to form an adduct having terminal —NCO groups and reacting the adduct with only the hydrogen of the secondary amino group of a compound having the formula $$HOR\text{—}NH\text{—}R_1$$

wherein R is an alkylene radical, the OH is a primary hydroxyl group, and $R_1$ is selected from the group consisting of —ROH, an aryl radical, an alkyl radical and a cyclohexyl radical.

5. The process of claim 4 wherein said polyalkylene ether is a polypropylene ether.

6. The process of claim 4 wherein said secondary amine is selected from the group consisting of N-methyl ethanolamine, N-ethyl ethanolamine, N-butyl ethanolamine, N-hydroxyl ethyl aniline, N-isopropyl propanol amine, N-cyclohexyl propanolamine, diethanolamine, dimethanolamine and methanol ethanolamine.

7. A method for making a polyurethane which comprises first reacting a polyalkylene ether glycol having secondary hydroxyl groups and a molecular weight of at least about 500 with an excess of organic polyisocyanate to form an —NCO terminated adduct, reacting said adduct with the hydrogen of a secondary amino group of a compound having the formula $$HOR\text{—}NH\text{—}R_1$$

wherein R is an alkylene radical, the OH is a primary hydroxyl group, and $R_1$ is selected from the group consisting of —ROH, an aryl radical, an alkyl radical, and a cyclohexyl radical to form an adduct having primary hydroxyl groups, and thereafter reacting the resulting product with an organic polyisocyanate to form a polyurethane.

8. The process of claim 7 wherein said polyalkylene ether glycol is a polypropylene ether.

9. The process of claim 7 wherein said secondary amine is selected from the group consisting of N-methyl ethanolamine, N-ethyl ethanolamine, N-butyl ethanolamine, N-hydroxyl ethyl aniline, N-isopropyl propanol amine, N-cyclohexyl propanol amine, diethanolamine, dimethanolamine and methanol ethanolamine.

10. A method for making a polyurethane foam which comprises first reacting a polyalkylene ether glycol having secondary hydroxyl groups and a molecular weight of at least about 500 with an excess of organic polyisocyanate to form an —NCO terminated adduct, reacting said adduct with the hydrogen of a secondary amino group of a compound having the formula

HOR—NH—R$_1$ wherein R is an alkylene radical, the OH is a primary hydroxyl group, and R$_1$ is selected from the group consisting of —ROH, an aryl radical, an alkyl radical, and a cyclohexyl radical to form an adduct having primary hydroxyl groups, and thereafter reacting the resulting product, water and an organic polyisocyanate to form a polyurethane foam.

11. A method for making a coating composition which comprises reacting a polyalkylene ether glycol having secondary hydroxyl groups and a molecular weight of at least about 500 with excess organic polyisocyanate to form an —NCO terminated adduct, reacting the —NCO group of the adduct with the hydrogen of the secondary amino group of a compound having the formula

HOR—NH—R$_1$ wherein R is an alkylene radical, the OH is a primary hydroxyl group, and R$_1$ is selected from the group consisting of —ROH, an aryl radical, an alkyl radical and a cyclohexyl radical to form a second adduct having primary hydroxy groups, dissolving the said second adduct in a solvent therefor, and mixing the resulting solution with the reaction product of an organic polyisocyanate and an alcohol.

References Cited in the file of this patent
UNITED STATES PATENTS

| | | |
|---|---|---|
| 2,858,296 | Stilmar | Oct. 28, 1958 |
| 2,917,471 | Nelson | Dec. 15, 1959 |
| 2,929,800 | Hill | Mar. 22, 1960 |
| 2,948,691 | Windemuth | Aug. 9, 1960 |

FOREIGN PATENTS

| | | |
|---|---|---|
| 700,610 | Great Britain | Dec. 9, 1953 |

OTHER REFERENCES

Bayer: "Modern Plastic," June 1947, pages 149–152 and 250–262.